United States Patent
Park et al.

(10) Patent No.: US 11,114,692 B2
(45) Date of Patent: Sep. 7, 2021

(54) POLYMER ELECTROLYTE FOR SECONDARY BATTERY AND LITHIUM SECONDARY BATTERY COMPRISING THE SAME

(71) Applicant: LG Chem, Ltd., Seoul (KR)

(72) Inventors: Sol Ji Park, Daejeon (KR); Kyoung Ho Ahn, Daejeon (KR); Young Jea Kim, Daejeon (KR); Yong Jin Jang, Daejeon (KR); Joong Jin Han, Daejeon (KR); Chul Haeng Lee, Daejeon (KR)

(73) Assignee: LG Chem, Ltd.

(*) Notice: Subject to any disclaimer, the term of this patent is extended or adjusted under 35 U.S.C. 154(b) by 0 days.

(21) Appl. No.: 16/468,589

(22) PCT Filed: Jul. 3, 2018

(86) PCT No.: PCT/KR2018/007529
§ 371 (c)(1),
(2) Date: Jun. 11, 2019

(87) PCT Pub. No.: WO2019/009594
PCT Pub. Date: Jan. 10, 2019

(65) Prior Publication Data
US 2020/0194832 A1 Jun. 18, 2020

(30) Foreign Application Priority Data

Jul. 6, 2017 (KR) .................. 10-2017-0086056

(51) Int. Cl.
*H01M 10/0565* (2010.01)
*H01M 10/0525* (2010.01)
*C08G 61/12* (2006.01)

(52) U.S. Cl.
CPC ........ *H01M 10/0565* (2013.01); *C08G 61/12* (2013.01); *H01M 10/0525* (2013.01); *C08G 2261/124* (2013.01); *C08G 2261/228* (2013.01); *C08G 2261/312* (2013.01); *C08G 2261/3142* (2013.01); *C08G 2261/334* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 2005/0234146 A1* | 10/2005 | Chen | .................. H01M 8/1027 522/90 |
| 2006/0127727 A1 | 6/2006 | Lee et al. | |
| 2009/0163692 A1* | 6/2009 | Moore | .................. C07C 317/14 528/174 |
| 2014/0363754 A1 | 12/2014 | Choi et al. | |
| 2015/0155559 A1 | 6/2015 | Zimmerman et al. | |
| 2016/0056502 A1 | 2/2016 | Kim et al. | |
| 2016/0233475 A1 | 8/2016 | Son et al. | |
| 2017/0170516 A1 | 6/2017 | Desmurs et al. | |
| 2018/0175372 A1 | 6/2018 | Zimmerman et al. | |
| 2018/0198124 A1* | 7/2018 | Zimmerman | ......... H01M 4/624 |
| 2019/0229315 A1* | 7/2019 | Sanchez | ............... H01M 50/411 |

FOREIGN PATENT DOCUMENTS

| | | |
|---|---|---|
| CN | 100344675 C | 10/2007 |
| EP | 3382785 A1 | 10/2018 |
| JP | 2016540353 A | 12/2016 |
| KR | 20060065991 A | 6/2006 |
| KR | 20090036999 A | 4/2009 |
| KR | 20150015427 A | 2/2015 |
| KR | 20160024411 A | 3/2016 |
| KR | 20160037616 A | 4/2016 |
| KR | 20170048354 A | 5/2017 |
| WO | 2016200785 A1 | 12/2016 |

OTHER PUBLICATIONS

English machine translation of Choi KR20160037616 (Year: 2016).*
Extended European Search Report for Application No. EP18828572.0 dated Mar. 4, 2020, 5 pages.
International Search Report from PCT/KR2018/007529 dated Sep. 27, 2018, 2 pages.
Rainbolt, Je. et al., "Substituent Effects on the Geometric and Electronic Properties of Tetracyano-p-quinodimethane (TCNQ): a Theoretical Study", Molecular Simulation, Sep. 17, 2013, vol. 39, No. 5, 8 pages.

* cited by examiner

*Primary Examiner* — Lisa S Park
(74) *Attorney, Agent, or Firm* — Lerner, David, Littenberg, Krumholz & Mentlik, LLP

(57) ABSTRACT

The present invention relates to a polymer electrolyte for a secondary battery and a lithium secondary battery comprising the same, and particularly, to a polymer electrolyte for a secondary battery, in which mechanical properties, ionic conductivity, and electrical conductivity are improved by comprising a polymer and an electron-acceptor having at least one double bond, as a dopant, and a lithium secondary battery in which electrochemical stability at high temperature and high voltage is enhanced by comprising the polymer electrolyte.

15 Claims, No Drawings

POLYMER ELECTROLYTE FOR SECONDARY BATTERY AND LITHIUM SECONDARY BATTERY COMPRISING THE SAME

CROSS-REFERENCE TO RELATED APPLICATIONS

The present application is a national phase entry under 35 U.S.C. § 371 of International Application No. PCT/KR2018/007529, filed on Jul. 3, 2018, which claims priority from Korean Patent Application No. 10-2017-0086056, filed on Jul. 6, 2017, the disclosures of which are incorporated herein by reference.

TECHNICAL FIELD

The present invention relates to a polymer electrolyte for a secondary battery and a lithium secondary battery comprising the same.

BACKGROUND ART

There is a growing demand for high performance, high stability secondary batteries as electric, electronic, communication, and computer industries have rapidly developed. Particularly, in line with miniaturization and lightweight trends of electronic (communication) devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

With respect to the lithium ion battery, it may have high capacity, but, since the liquid electrolyte containing a lithium salt is used, there may be a risk of leakage and explosion and battery design may be complicated to prepare for the risk.

With respect to the lithium polymer battery, since a solid polymer electrolyte or a gel polymer electrolyte containing an electrolyte solution is used as the electrolyte, stability is improved and, simultaneously, flexibility is obtained, and thus, the lithium polymer battery may be developed in various forms, for example, in the form of small or thin-film batteries. In particular, in a case in which the gel polymer electrolyte is used, since the number of components used in the preparation of the lithium secondary battery may be reduced, a cost-saving effect may also be expected.

However, since the polymer electrolyte has significantly lower ionic conductivity than the liquid electrolyte, the polymer electrolyte may not be suitable for commercialization.

For example, with respect to polyethylene oxide which has been widely used as the polymer electrolyte, it has an excellent ability to dissociate an ion conductive metal salt despite the fact that it is in a solid state. That is, since cations of the alkali metal salt are stabilized while the cations are coordinated with oxygen atoms present in the polyethylene oxide to form a complex, the cations may be present in a stable ionic state without a solvent. However, since the polyethylene oxide has a semi-crystalline structure at room temperature, this crystal structure interfere the movement of the dissociated metal salt. Therefore, there is disadvantageous that energy characteristics are degraded, for example, it has a low ionic conductivity value of about $1.0 \times 10^{-8}$ S/cm at room temperature. Thus, it may not be suitable for commercialization.

Thus, there is an urgent need to develop a polymer electrolyte material in which processability and mechanical strength are secured and ionic conductivity and electrical conductivity improvement effect and battery safety effect are enhanced.

PRIOR ART DOCUMENT

Japanese Patent Application Laid-open Publication No. 2016-540353

DISCLOSURE OF THE INVENTION

Technical Problem

An aspect of the present invention provides a polymer electrolyte for a secondary battery having excellent mechanical strength and improved electrical conductivity and ionic conductivity.

Another aspect of the present invention provides a lithium secondary battery in which battery safety at high voltage and high temperature is enhanced by comprising the polymer electrolyte for a secondary battery.

Technical Solution

According to an aspect of the present invention, there is provided a polymer electrolyte for a secondary battery comprising:

a polymer represented by Formula 1 or Formula 2; and
an electron-acceptor having at least one double bond, as a dopant:

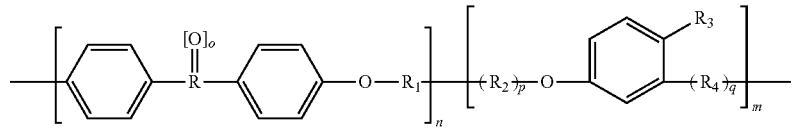

[Formula 1]

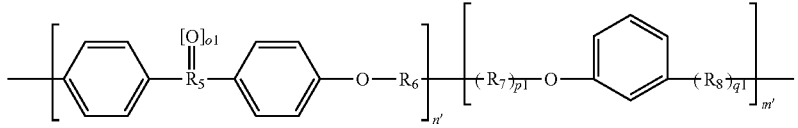

[Formula 2]

wherein R and $R_5$ are each independently carbon (C) or sulfur (S), $R_1$ and $R_6$ are each independently

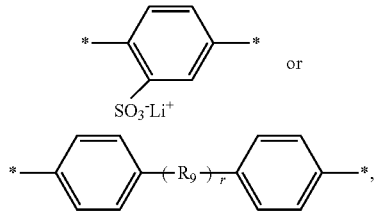

or

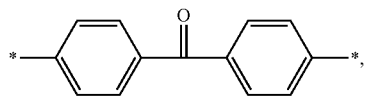

wherein $R_9$ is —O(CF$_3$)$_2$—, $R_2$ and $R_7$ are

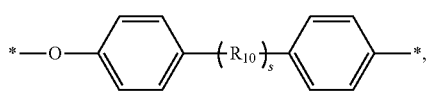

$R_3$ is —S(OF$_2$)$_2$SO$_3^-$Li$^+$, $R_4$ is

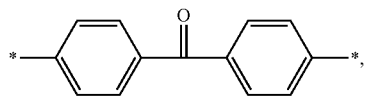

wherein $R_{10}$ is —C(CF$_3$)$_2$—, $R_8$ is

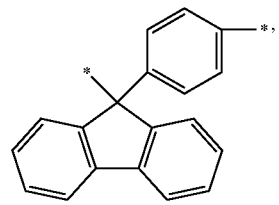

o and o1 are 1 or 2, p, p1, q, q1, r, and s are 0 or 1, a ratio of n:m is in a range of 95:5 to 5:95 as a molar ratio, and a ratio of n':m' is in a range of 95:5 to 5:95 as a molar ratio.

In Formula 1, the ratio of n:m may be in a range of 40:60 to 60:40, for example, 50:50 as a molar ratio. Also, in Formula 2, the ratio of n':m' may be in a range of 40:60 to 60:40, for example, 50:50 as a molar ratio.

The polymer represented by Formula 1 or Formula 2 may have a weight-average molecular weight (Mw) of 5,000 g/mol to 1,500,000 g/mol, particularly 50,000 g/mol to 1,500,000 g/mol, and more particularly 500,000 g/mol to 1,000,000 g/mol.

Also, the polymer represented by Formula 1 may comprise at least one selected from the group consisting of compounds represented by Formulae 1a to 1c:

[Formula 1a]

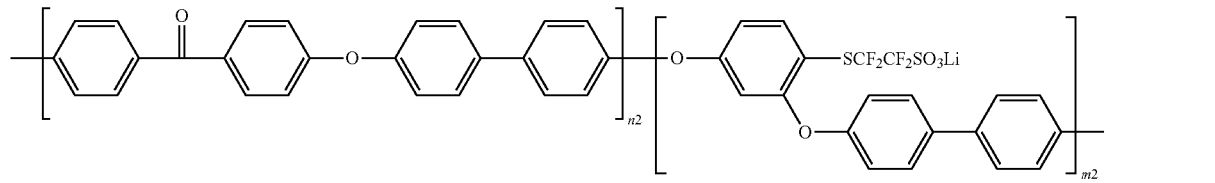

[Formula 1b]

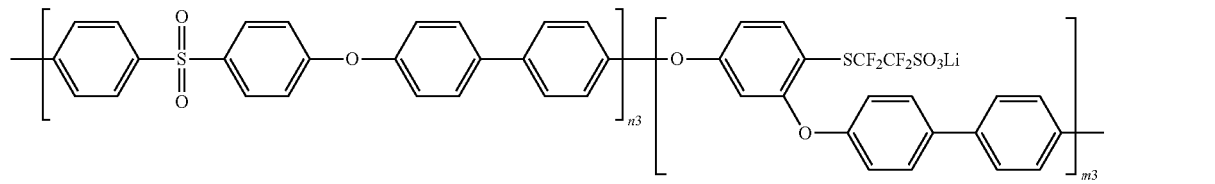

[Formula 1c]

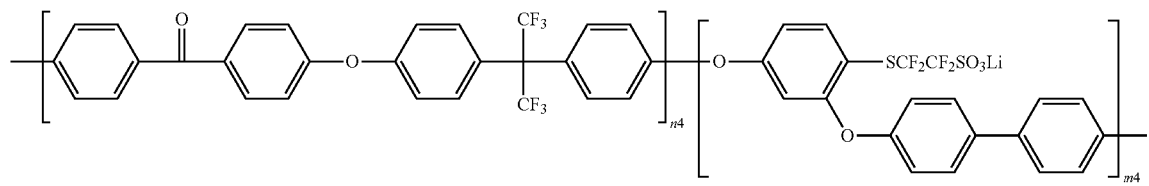

wherein, in Formulae 1a to 1c, a ratio of n2:m2 is in a range of 95:5 to 5:95 as a molar ratio, a ratio of n3:m3 is in a range of 95:5 to 5:95 as a molar ratio, and a ratio of n4:m4 is in a range of 95:5 to 5:95 as a molar ratio.

Furthermore, the polymer represented by Formula 2 may be a compound represented by Formula 2a:

[Formula 2a]

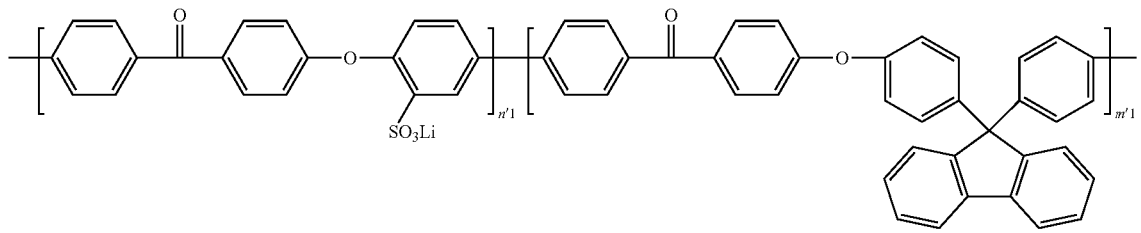

wherein, in Formula 2a,
a ratio of n'1:m'1 is in a range of 95:5 to 5:95 as a molar ratio.

Also, the electron-acceptor having at least one double bond may comprise at least one selected from the group consisting of Formulae 3 to 7:

[Formula 3]

[Formula 4]

[Formula 5]

[Formula 6]

[Formula 7]

A molar ratio of the polymer:the electron-acceptor is in a range of 1:0.01 to 1:500, particularly 1:0.1 to 1:400, and more particularly 1:0.1 to 1:200.

The polymer electrolyte for a secondary battery may further comprise a lithium salt.

The lithium salt may comprise $Li^+$ as a cation, and may comprise at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $B(C_2O_4)_2^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2N^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

The lithium salt may be comprised in a concentration of 0.01 M to 5 M, particularly 0.1 M to 5 M, and more particularly 0.1 M to 3 M in the polymer electrolyte for a secondary battery.

The polymer electrolyte for a secondary battery may be a free-standing solid polymer electrolyte.

Also, the polymer electrolyte may be in the form of a solid polymer-liquid hybrid electrolyte further comprising an ionic liquid.

The ionic liquid may comprise at least one selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, 1-ethyl-3-methylimidazolium-bis(trifluoromethylsulfonyl) imide (EMIN-TFSI), 1-ethyl-3-methylimidazolium bis(fluorosulfonyl)imide (EMI-FSI), N-methyl-N-propylpyrrolidinium bis(fluorosulfonyl)imide (Pyr 13-FSI), N-methyl-N-propylpyrrolidinium bis(trifluoromethanesulfonyl)imide (Pyr 14-TFSI), N-methyl-N-propylpiperidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

The ionic liquid may be comprised in an amount of 0.01 wt % to 50 wt %, for example, 0.01 wt % to 20 wt % based on a total weight of the polymer electrolyte.

According to another aspect of the present invention, there is provided a lithium secondary battery comprising:
a positive electrode, a negative electrode, and a polymer electrolyte formed on at least one surface of the positive electrode and the negative electrode, wherein the polymer electrolyte comprises the polymer electrolyte for a secondary battery of the present invention.

Advantageous Effects

In the present invention, a polymer electrolyte for a secondary battery having improved electrical conductivity and ionic conductivity as well as excellent mechanical properties may be provided, and a lithium secondary battery, in which battery safety is enhanced by electrochemical stability at high voltage and high temperature, may be prepared by using the polymer electrolyte.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Hereinafter, a polymer electrolyte for a secondary battery and a secondary battery comprising the same will be described in more detail.

Specifically, in an embodiment of the present invention, provided is a polymer electrolyte for a secondary battery which comprises:

a polymer represented by Formula 1 or Formula 2 below; and an electron-acceptor having at least one double bond, as a dopant.

[Formula 1]

[Formula 2]

R and $R_5$ are each independently carbon (C) or sulfur (S), $R_1$ and $R_6$ are each independently wherein $R_9$ is —C(CF$_3$)$_2$—, $R_2$ and $R_9$ are $R_3$ is —S(CF$_2$)$_2$SO$_3$Li$^+$, $R_4$ is

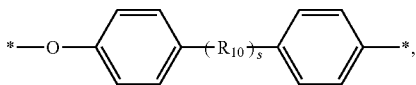

wherein $R_{10}$ is —C(CF$_3$)$_2$—, $R_8$ is

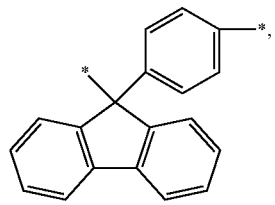

o and o1 are 1 or 2, p, p1, q, q1, r, and s are 0 or 1, a ratio of n:m is in a range of 95:5 to 5:95 as a molar ratio, and a ratio of n':m' is in a range of 95:5 to 5:95 as a molar ratio.

In the polymer electrolyte for a secondary battery of the present invention, n and m of the polymer represented by Formula 1 and n' and m' of the polymer represented by Formula 2 denote the number of repetitions of repeating units. In the polymers represented by Formula 1 or 2, repeating units such as n, m, n', and m' may be alternatingly, graftedly, or randomly arranged while having predetermined rules between one another or having no rules.

Specifically, in Formula 1, the ratio of n:m may be in a range of 40:60 to 60:40, for example, 50:50 as a molar ratio. Also, in Formula 2, the ratio of n':m' may be in a range of 40:60 to 60:40, for example, 50:50 as a molar ratio.

In this case, in the polymers represented by Formula 1 or Formula 2, $R_1$, $R_6$, $R_4$, and $R_8$ may not comprise an ether group. For example, in a case in which $R_1$, $R_6$, $R_4$, and $R_8$ comprise an ether group, a poly(ether ether ketone) (PEEK) bonding structure is formed, wherein, since cleavage of —O— and —CO— moieties may occur in this structure (RSC Advances, 2012, 2, 4079-4091), there is a limitation in that its electrochemical and thermal stabilities are lower than those of the polymer of the present invention. Thus, assuming that they have the same or nearly similar weight-average molecular weight, in a case in which an ether group is further comprised in the $R_1$, $R_6$, $R_4$, and $R_8$ structures in the polymer represented by Formula 1 or Formula 2, an oxidation initiation voltage may appear at a lower voltage of less than 6 V in comparison to the polymer of the present invention which does not comprise an ether group. Furthermore, since mobility of lithium ions is relatively reduced due to an interaction with many oxygen atoms additionally comprised in the polymer structure, ionic conductivity may be slightly deteriorated in compassion to that of the polymer of the present invention.

The polymer represented by Formula 1 or Formula 2 may have a weight-average molecular weight (Mw) of 5,000 g/mol to 1,500,000 g/mol, particularly 50,000 g/mol to 1,500,000 g/mol, and more particularly 500,000 g/mol to 1,000,000 g/mol.

When the weight-average molecular weight of the polymer is within the above range, a polymer electrolyte having improved mechanical properties, processability (formability), and battery safety may be prepared. Specifically, in a case in which the weight-average molecular weight (Mw) is in a range of 5,000 g/mol to 1,500,000 g/mol, the processability (formability) and battery safety effect as well as the mechanical properties of the polymer electrolyte may be secured.

The weight-average molecular weight may be measured using gel permeation chromatography (GPC). For example, a sample having a predetermined concentration is prepared, and Alliance 4, a GPC measurement system, is then stabilized. When the system is stabilized, a standard sample and the sample are injected into the system to obtain a chromatogram, and a molecular weight is then calculated using an analytical method (system: Alliance 4, Column: Ultrahydrogel linear×2, eluent: 0.1M $NaNO_3$ (pH 7.0 phosphate buffer, flow rate: 0.1 mL/min, temp: 40° C., injection: 100 μL)).

The polymer represented by Formula 1 may comprise at least one selected from the group consisting of compounds represented by the following Formulae 1a to 1c.

[Formula 1a]

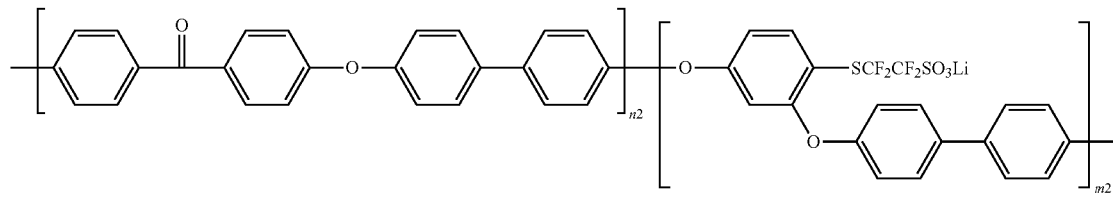

[Formula 1b]

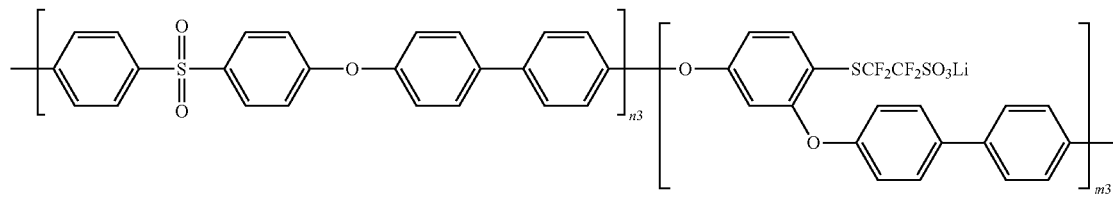

[Formula 1c]

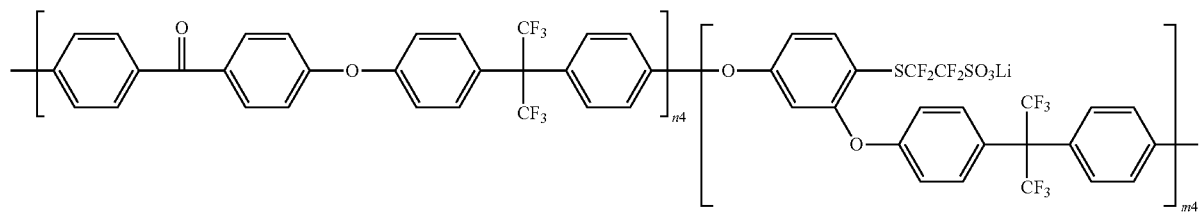

In Formulae 1a to 1c,
a ratio of n2:m2 is in a range of 95:5 to 5:95 as a molar ratio,
a ratio of n3:m3 is in a range of 95:5 to 5:95 as a molar ratio, and
a ratio of n4:m4 is in a range of 95:5 to 5:95 as a molar ratio.

The polymer represented by Formula 2 may be a compound represented by the following Formula 2a.

[Formula 2a]

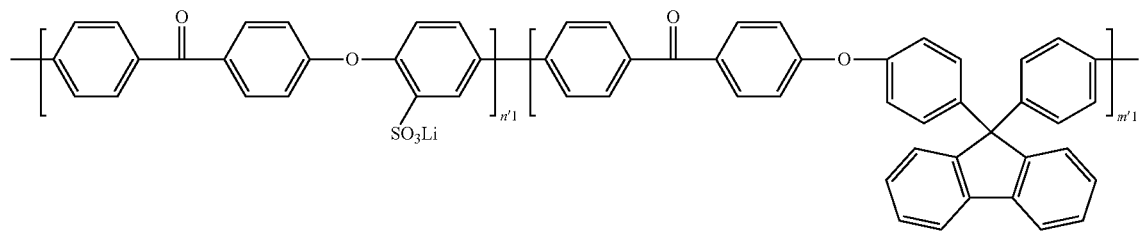

In Formula 2a, a ratio of n'1:m'1 is in a range of 95:5 to 5:95 as a molar ratio.

Also, in the polymer electrolyte for a secondary battery according to an embodiment of the present invention, the electron-acceptor having at least one double bond is a dopant capable of forming a high density polar region in the polymer for transportation and movement of lithium ions, wherein the electron-acceptor may comprise at least one selected from the group consisting of Formulae 3 to 7 below.

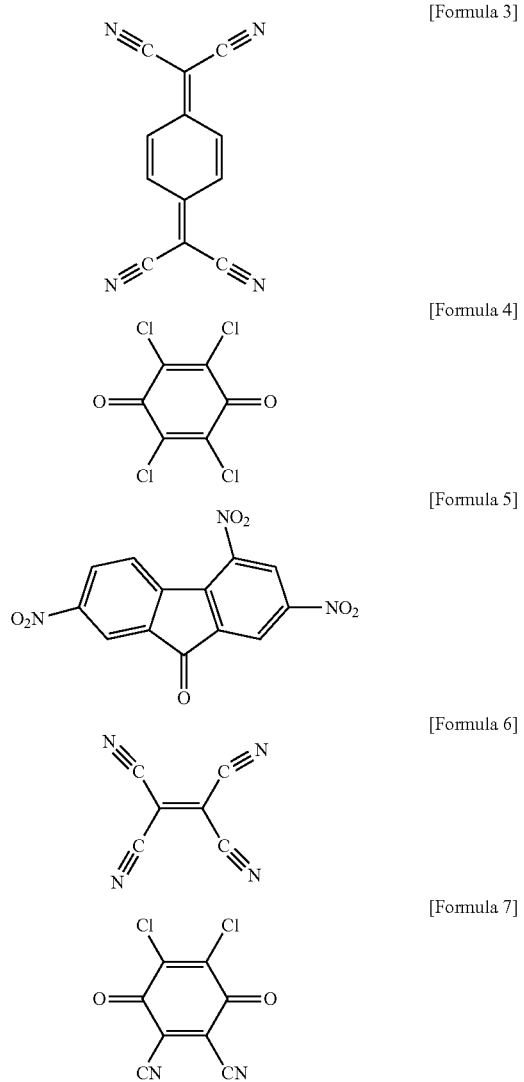

[Formula 3]

[Formula 4]

[Formula 5]

[Formula 6]

[Formula 7]

A molar ratio of the polymer:the electron-acceptor is in a range of 1:0.01 to 1:500, particularly 1:0.1 to 1:400, and more particularly 1:0.1 to 1:200.

In a case in which the electron-acceptor is comprised within the above range, a secondary battery having more improved overall performance may be prepared. Specifically, in a case in which the molar ratio of the electron-acceptor having at least one double bond to 1 mol of the polymer is 0.01 or more, solubility of a solvent may not only be improved, but a melting point of the polymer may also be changed so that molding is possible at a lower temperature, and thus, processability and electronic conductivity may be improved. Also, in a case in which the molar ratio of the electron-acceptor having at least one double bond to 1 mol of the polymer is 500 or less, a side reaction between the electron-acceptor and the polymer may be prevented, and, accordingly, mechanical properties may be secured.

With respect to a typical polymer electrolyte until now, it is disadvantageous in that it has low ionic conductivity because movement speed of lithium ions is low due to high resistance in the battery in comparison to a liquid electrolyte solution.

In contrast, since the polymer electrolyte of the present invention comprises the polymer represented by Formula 1 or Formula 2, as a conjugated polymer containing both lithium ion ($Li^+$) source and sulfonate group in a substituent, the polymer electrolyte of the present invention may prevent a side reaction of lithium ions ($Li^+$) and decomposition of salt due to an anion stationary phase and may simultaneously provide free lithium ions (free $Li^+$), and thus, the movement effect of the lithium ions may be improved. Therefore, since ionic conductivity and electrical conductivity are improved even if an electrolyte salt is not used as an essential component, operation of the battery in the form of an all solid-ion battery may be possible.

Furthermore, since the polymer electrolyte of the present invention comprises the polymer represented by Formula 1 or Formula 2 which comprises the poly(ether ether ketone) structure, it may have semi-crystalline thermoplastic properties, and better mechanical properties and thermal stability may be achieved.

Also, since the polymer electrolyte of the present invention may also comprise the electron-acceptor capable of accepting electrons of the polymer as a dopant, the polymer is charged by the dopant, and thus, the electronic conductivity and ionic conductivity of the polymer electrolyte of the present invention may be further improved.

Furthermore, in order to further improve an effect of lithium cation transfer characteristics, the polymer electrolyte of the present invention may further comprise a lithium salt.

The lithium salt may comprise $Li^+$ as a cation, and may comprise at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $B(C_2O_4)_2^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2N^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or may be used in a mixture of two or more thereof, if necessary. The lithium salt may be appropriately changed in a normally usable range, but may be comprised in a concentration of 0.01 M to 5 M, particularly 0.1 M to 5 M, and more particularly 0.1 M to 3 M in the polymer electrolyte in order to obtain an optimum corrosion protection film formation effect on the surface of an electrode.

The polymer electrolyte of the present invention may be formed in the form of a free-standing solid polymer electrolyte which is only composed of the polymer represented by Formula 1 or Formula 2 and the electron-acceptor, or is formed by mixing the polymer represented by Formula 1 or Formula 2, the electron-acceptor, and the lithium salt.

The solid polymer electrolyte may have an ionic conductivity of $10^{-9}$ S/cm to $10^{-5}$ S/cm.

The ionic conductivity may be measured by an AC impedance method. The ionic conductivity was measured in a frequency range of 0.01 Hz to 1 MHz using a VMP3 measurement instrument and 4294A.

Also, since the polymer electrolyte of the present invention comprises an ionic liquid on a polymer matrix composed of the polymer represented by Formula 1 or Formula 2, it may form a solid polymer-liquid hybrid electrolyte in which the ionic liquid and the polymer matrix, which is composed of the polymer represented by Formula 1 or Formula 2, the electron-acceptor, and selectively the lithium salt, are used together.

In a case in which the polymer electrolyte of the present invention comprises the ionic liquid, since a layer having high ionic conductivity may be further formed on a surface of the polymer electrolyte after drying to make the movement of lithium ions ($Li^+$ flux) uniform, the ionic liquid may allow a phenomenon, in which $Li^+$ ions are plated or stripped on the surface of a negative electrode, to be uniform, and thus, the ionic liquid may suppress the formation of lithium dendrites.

As a typical example, the ionic liquid may comprise at least one selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, 1-ethyl-3-methylimidazolium-bis(trifluoromethylsulfonyl)imide (EMIN-TFSI), 1-ethyl-3-methylimidazolium bis(fluorosulfonyl)imide (EMI-FSI), N-methyl-N-propylpyrrolidinium bis(fluorosulfonyl)imide (Pyr 13-FSI), N-methyl-N-propylpyrrolidinium bis(trifluoromethanesulfonyl)imide (Pyr 14-TFSI), N-methyl-N-propylpiperidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

The ionic liquid may be comprised in an amount of 50 wt % or less, particularly 0.01 wt % to 50 wt %, and more particularly 0.01 wt % to 20 wt % based on a total weight of the polymer electrolyte.

In a case in which the amount of the ionic liquid is 50 wt % or less, a reduction in the movement of lithium ions due to an increase in viscosity may be prevented, and the formation of the lithium dendrites on the surface of the lithium negative electrode may be improved.

The ionic liquid may further comprise a salt compound, if necessary.

The solid polymer-liquid hybrid electrolyte may have an ionic conductivity of $10^{-6}$ S/cm to $10^{-4}$ S/cm.

The ionic conductivity may be measured by an AC impedance method. The ionic conductivity was measured in a frequency range of 0.01 Hz to 1 MHz using a VMP3 measurement instrument and 4294A.

The solid or solid polymer-liquid hybrid electrolyte of the present invention may be formed by a conventional solution casting method known in the art.

Specifically, after the polymer represented by Formula 1 or Formula 2 of the present invention, the electron-acceptor, and, if necessary, the lithium salt are added to an organic solvent and stirred, the mixture is directly coated on one surface of the electrode or is flow-coated (cast) on a support base material, such as a glass substrate, polyethylene terephthalate (PET), Teflon, or a fluorinated ethylene propylene (FEP) film, to form a coating layer and dried (organic solvent removal), and thus, the free-standing solid polymer electrolyte may be prepared in the form of a film in which the electron-acceptor and the lithium salt are uniformly distributed in a polymer network composed of the polymer represented by Formula 1 or Formula 2.

Also, after the polymer represented by Formula 1 or Formula 2 of the present invention, the electron-acceptor, and, if necessary, the lithium salt are added to an organic solvent and stirred, the mixture is directly coated on the electrode or is coated on a support base material by the above-described solution casting method and then dried to prepare a solid polymer electrolyte in the form of a film, and, subsequently, a solid polymer-liquid hybrid electrolyte having improved battery safety may be formed by further injecting an ionic liquid, which does not dissolve the dried solid polymer electrolyte film, into a battery case.

In this case, a volatile organic solvent having a low boiling point or a non-volatile organic solvent used in a non-aqueous electrolyte may all be used as the organic solvent which is used to dissolve the polymer represented by Formula 1 or Formula 2 and the electron-acceptor, and, as a typical example, the organic solvent may comprise a single material selected from the group consisting of N,N'-dimethylacetamide, N-methyl-2-pyrrolidone (NMP), dimethylsulfoxide (DMSO), N,N-dimethylformamide (DMF), acetonitrile (AN), propylene carbonate (PC), ethylene carbonate (EC), butylene carbonate (BC), dimethyl carbonate (DMC), diethyl carbonate (DEC), ethylmethyl carbonate (EMC), fluoroethylene carbonate (FEC), γ-butyrolactone (GBL), 1,2-dimethoxy ethane, tetrahydrofuran (THF), 2-methyl tetrahydrofuran, dimethyl sulfoxide, 1,3-dioxolane (DOL), 1,4-dioxane, formamide, dimethylformamide, dioxolane, acetonitrile, nitromethane, methyl formate, ethyl acetate (EA), ethyl propionate (EP), methyl acetate (MA), methyl propionate (MP), dimethoxyethane (DME), phosphate triester, diethyl ether, trimethoxy methane, triglyme, tetraglyme (TEGDME), sulfolane, methyl sulfolane, and 1,3-dimethyl-2-imidazolidinone, ethyl propionate, methyl propionate or a mixture of two or more thereof.

Specifically, it is desirable that the organic solvent comprises a low boiling point organic solvent, such as acetonitrile, or a highly volatile organic solvent, such as N-methyl-2-pyrrolidone, so that the organic solvent is easily removed. Also, in a case in which the polymer electrolyte of the present invention is prepared in the form of a solid polymer-liquid hybrid electrolyte, a non-volatile organic solvent, such as tetraglyme, may also be used so that the organic solvent well swells the polymer electrolyte to be able to maintain the solid polymer-liquid hybrid electrolyte form.

An amount of the organic solvent used is not particularly limited as long as the organic solvent is used in an amount such that the polymer represented by Formula 1 or Formula 2 and the electron-acceptor are easily coated, but the organic solvent may be used in an amount of about 100 parts by weight to about 10,000 parts by weight, for example, 1,000 parts by weight to 5,000 parts by weight based on 100 parts by weight of the polymer represented by Formula 1 or Formula 2 such that uniformity of the film may be secured during the molding of the polymer electrolyte and, simultaneously, effects of mechanical properties, thin-film thickness, and ionic conductivity may be sufficiently secured.

In a case in which the amount of the organic solvent used is greater than 10,000 parts by weight, it is not only difficult to remove the organic solvent, but it is also difficult to sufficiently secure the effects of mechanical properties, thin-film thickness, and ionic conductivity of the polymer electrolyte due to the residual organic solvent. Also, in a case in which the amount of the organic solvent used is less than 100 parts by weight, since it is difficult to uniformly coat the polymer represented by Formula 1 or Formula 2, the uniformity of the film may be reduced during the molding of the polymer electrolyte.

Furthermore, in an embodiment of the present invention, provided is a lithium secondary battery comprising a positive electrode, a negative electrode, and a polymer electrolyte formed on at least one surface of the positive electrode and the negative electrode, wherein the polymer electrolyte comprises the polymer electrolyte of the present invention.

The polymer electrolyte may comprise a free-standing solid polymer electrolyte or solid polymer-liquid hybrid electrolyte.

The lithium secondary battery of the present invention may further comprise a separator, if necessary.

In the secondary battery according to an embodiment of the present invention, the polymer electrolyte may be disposed on at least one surface of the positive electrode and the negative electrode or at least one surface of the positive electrode, the negative electrode, and the separator.

As described above, ① the polymer electrolyte is prepared in the form of a film comprising the polymer represented by Formula 1 or Formula 2 and the electron-acceptor and is then disposed (introduced) on at least one surface of the prepared negative electrode, positive electrode, and separator, or ② after the polymer represented by Formula 1 or Formula 2 and the electron-acceptor are dissolved in an organic solvent to be prepared as a coating solution, the polymer electrolyte may be introduced by directly coating at least one surface of the prepared negative electrode, positive electrode, and separator with the coating solution and then drying the coated surface.

A thickness of the polymer electrolyte in the form of a film may be in a range of about 0.5 µm to about 300 µm in consideration of the ionic conductivity. In a case in which the thickness of the electrolyte film is 0.5 µm or more, strength of the film may be secured, and, in a case in which the thickness is 300 µm or less, since a proton ($H^+$), as an ion transporter, may easily pass through the film, an increase in volume for each secondary battery stack is prevented, and thus, a high-performance secondary battery may be prepared.

The positive electrode and the negative electrode constituting the lithium secondary battery of the present invention may be prepared by a conventional method and used.

First, the positive electrode may be prepared by forming a positive electrode material mixture layer on a positive electrode collector. The positive electrode material mixture layer may be formed by coating the positive electrode collector with a positive electrode slurry comprising a positive electrode active material, a binder, a conductive agent, and a solvent, and then drying and rolling the coated positive electrode collector.

The positive electrode collector is not particularly limited so long as it has high conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically comprise a lithium composite metal oxide comprising lithium and at least one metal such as cobalt, manganese, nickel, or aluminum. Specifically, the lithium composite metal oxide may comprise lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or a compound of two or more thereof may be comprised.

Among these materials, in terms of the improvement of capacity characteristics and stability of the battery, the lithium composite metal oxide may comprise $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be comprised in an amount of 80 wt % to 99 wt % based on a total weight of solid content in the positive electrode active material slurry.

The binder is a component that assists in the binding between the active material and the conductive agent and in the binding with the current collector, wherein the binder is commonly added in an amount of 1 wt % to 30 wt % based on the total weight of the solid content in the positive electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode active material slurry.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may comprise acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may comprise an organic solvent, such as N-methyl-2-pyrrolidone (NMP), and may be used in an amount such that desirable viscosity is obtained when the positive electrode active material as well as selectively the binder and the conductive agent are comprised. For example, the solvent may be comprised so that a concentration of the solid content in the slurry comprising the positive electrode active material as well as selectively the binder and the conductive agent is in a range of 10 wt % to 70 wt %, for example, 20 wt % to 60 wt %.

Also, the negative electrode may be prepared by forming a negative electrode material mixture layer on a negative electrode collector. The negative electrode material mixture layer may be formed by coating the negative electrode collector with a negative electrode active material slurry comprising a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material. The negative electrode collector may be used in various shapes such as a film, a sheet, a foil, a net, a porous body, a foam body, a non-woven fabric body, and the like.

Furthermore, the negative electrode active material may comprise at least one selected from the group consisting of lithium metal, a carbon material capable of reversibly intercalating/deintercalating lithium ions, metals or alloys of lithium and these metals, a metal composite oxide, a material which may be doped and undoped with lithium, and a transition metal oxide.

As the carbon material capable of reversibly intercalating/deintercalating lithium ions, any carbon material may be used without particular limitation so long as it is a carbon-based negative electrode active material generally used in a lithium ion secondary battery, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metals or alloys of lithium and these metals, metals selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn) or alloys of lithium and these metals may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ (0≤x≤1), $Li_xWO_2$ (0≤x≤1), and $Sn_xMe_{1-x}Me'_yO_z$ (Me:manganese (Mn), iron (Fe), Pb, or Ge; Me':Al, boron (B), phosphorus (P), Si, Groups I, II and III elements of the periodic table, or halogen; 0<x≤1; 1≤y≤3; 1≤z≤8) may be used as the metal composite oxide.

The material, which may be doped and undoped with lithium, may comprise Si, $SiO_x$ (0<x<2), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, radium (Ra), scandium (Sc), yttrium (Y), titanium (Ti), zirconium (Zr), hafnium (Hf), vanadium (V), niobium (Nb), tantalum (Ta), dubidium (Db), chromium (Cr), molybdenum (Mo), tungsten (W), seaborgium (Sg), Tc (technetium), rhenium (Re), Bh (bohrium), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (ga), Sn, indium (In), Ti, Ge, P, arsenic (As), Sb, bismuth (Bi), sulfur (S), selenium (Se), tellurium (Te), Po (polonium), and a combination thereof.

The transition metal oxide may comprise lithium-containing titanium composite oxide (LTO), vanadium oxide, and lithium vanadium oxide.

The negative electrode active material may be comprised in an amount of 80 wt % to 99 wt % based on a total weight of solid content in the negative electrode active material slurry.

The binder is a component that assists in the binding between the conductive agent, the active material, and the current collector, wherein the binder is commonly added in an amount of 1 wt % to 30 wt % based on the total weight of the solid content in the negative electrode active material slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode active material slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may comprise water or an organic solvent, such as N-methyl-2-pyrrolidone (NMP) and alcohol, and may be used in an amount such that desirable viscosity is obtained when the negative electrode active material as well as selectively the binder and the conductive agent are comprised. For example, the solvent may be comprised in an amount such that a concentration of the solid content in the slurry comprising the negative electrode active material as well as selectively the binder and the conductive agent is in a range of 50 wt % to 95 wt %, for example, 70 wt % to 90 wt %.

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but the lithium secondary battery may have various shapes, such as a cylindrical shape, a prismatic shape, a pouch shape, or a coin shape, depending on purposes. The lithium secondary battery according to the embodiment of the present invention may be a pouch type secondary battery.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Electrode Preparation)

A positive electrode material mixture was prepared by adding 92 wt % of a 4.2 V-class $LiCoO_2$ compound as a positive electrode active material, 4 wt % of carbon black as a conductive agent, and 2 wt % of polyvinylidene fluoride (PVDF), as a binder component, to N-methyl-2-pyrrolidone (NMP) as a solvent.

A surface of a 20 μm thick aluminum (Al) thin film was coated with the positive electrode material mixture to a thickness of 10 μm and then dried to prepare a positive electrode plate.

A copper (Cu) thin film was coated with lithium metal and then rolled to prepare a 20 μm thick negative electrode plate.

(Polymer Electrolyte Preparation)

100 g of the polymer of Formula 2a (weight-average molecular weight (Mw)=660,000, n'1:m'1=50:50) and the electron-acceptor of Formula 3 were mixed in a molar ratio of 1:0.2, added to 500 g of NMP and then stirred to prepare a mixed solution. At least one surface of the positive electrode plate was coated with the mixed solution and dried to prepare a solid polymer electrolyte having a thickness of 50 μm (see Table 1 below).

(Secondary Battery Preparation)

An electrode assembly was prepared by disposing a polyolefin-based separator (thickness: 20 μm) between the prepared negative electrode and positive electrode comprising the polymer electrolyte, and the electrode assembly was accommodated in a pouch type battery case and a liquid electrolyte solution, which comprises 1 M $LiPF_6$ dissolved in a solvent in which EC and DEC were mixed in a ratio of 5:5 vol %, was injected thereinto to prepare a 4.2 V-class secondary battery (full cell).

Example 2

A polymer electrolyte and a secondary battery comprising the same were prepared in the same manner as in Example 1 except that, instead of the polymer represented by Formula 2a, the polymer represented by Formula 1a (weight-average molecular weight (Mw) 743,000, n2:m2=50:50) and the electron-acceptor of Formula 4 were added in a molar ratio of 1:0.2 in Example 1.

Example 3

A polymer electrolyte and a secondary battery comprising the same were prepared in the same manner as in Example 1 except that, instead of the polymer represented by Formula 2a, the polymer represented by Formula 1b (weight-average molecular weight (Mw) 936,000, n3:m3=50:50) and the electron-acceptor of Formula 5 were added in a molar ratio of 1:0.2 in Example 1.

Example 4

A polymer electrolyte and a secondary battery comprising the same were prepared in the same manner as in Example 1 except that, instead of the polymer represented by Formula 2a, the polymer represented by Formula 1c (weight-average molecular weight (Mw) 1,300,000, n4:m4=50:50) and the electron-acceptor of Formula 6 were added in a molar ratio of 1:0.2 in Example 1.

Example 5

A polymer electrolyte and a secondary battery comprising the same were prepared in the same manner as in Example 1 except that, in the preparation of the polymer electrolyte, instead of the electron-acceptor of Formula 3, the electron-acceptor of Formula 7 was used and 1M $LiPF_6$ was further added.

Example 6

A polymer electrolyte and a secondary battery comprising the same were prepared in the same manner as in Example 2 except that, in the preparation of the polymer electrolyte, instead of the electron-acceptor of Formula 4, the electron-acceptor of Formula 7 was added in a molar ratio of the polymer:the electron-acceptor of 1:0.1 and 1M $LiPF_6$ was further added.

Example 7

A polymer electrolyte and a secondary battery comprising the same were prepared in the same manner as in Example 3 except that, in the preparation of the polymer electrolyte, the polymer and the electron-acceptor were added in a molar ratio of 1:0.1 and 1M $LiPF_6$ was further added.

Example 8

A polymer electrolyte and a secondary battery comprising the same were prepared in the same manner as in Example 4 except, in the preparation of the polymer electrolyte, that the polymer and the electron-acceptor were added in a molar ratio of 1:0.1 and 1M LiPF$_6$ was further added.

Example 9

A polymer electrolyte was prepared in the same manner as in Example 5 except that the polymer and the electron-acceptor were added in a molar ratio of 1:0.1. Subsequently, during the preparation of a secondary battery, 10 g of an ionic liquid (EMIM-TFSI) was further added per 90 g of the prepared polymer electrolyte to prepare a polymer electrolyte of the present invention and a secondary battery comprising the same.

Example 10

A polymer electrolyte and a secondary battery comprising the same were prepared in the same manner as in Example 7 except that, after the polymer electrolyte was prepared, 10 g of an ionic liquid (EMIM-TFSI) was further added per 90 g of the polymer electrolyte during the preparation of the secondary battery.

Example 11

A polymer electrolyte and a secondary battery comprising the same were prepared in the same manner as in Example 1 except that the polymer and the electron-acceptor were added in a molar ratio of 1:400 during the preparation of the polymer electrolyte.

Example 12

A polymer electrolyte and a secondary battery comprising the same were prepared in the same manner as in Example 2 except that the polymer and the electron-acceptor were added in a molar ratio of 1:400 during the preparation of the polymer electrolyte.

Example 13

A polymer electrolyte and a secondary battery comprising the same were prepared in the same manner as in Example 1 except that the polymer of Formula 2a (weight-average molecular weight (Mw)=2,100,000, n'1:m'1=50:50) and the electron-acceptor of Formula 7 were added in a molar ratio of 1:0.001 during the preparation of the polymer electrolyte.

Example 14

A polymer electrolyte and a secondary battery comprising the same were prepared in the same manner as in Example 4 except that the polymer of Formula 1c (weight-average molecular weight (Mw)=2,440,000, n'1:m'1=50:50) and the electron-acceptor of Formula 7 were added in a molar ratio of 1:0.001 during the preparation of the polymer electrolyte.

Comparative Example 1

A polymer electrolyte and a secondary battery comprising the same were prepared in the same manner as in Example 1 except that, in the preparation of the polymer electrolyte, the electron-acceptor was not added, and only a lithium salt was added.

Comparative Example 2

A polymer electrolyte and a secondary battery comprising the same were prepared in the same manner as in Example 4 except that, instead of the polymer represented by Formula 1c, a polymer electrolyte composed of a compound represented by the following Formula 8 was used.

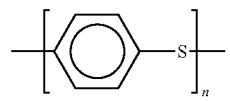

[Formula 8]

where, n is an integer of 5,556.

Comparative Example 3

A polymer electrolyte and a secondary battery comprising the same were prepared in the same manner as in Comparative Example 2 except, in the preparation of the polymer electrolyte, that the electron-acceptor was not added, and 1M lithium salt (LiPF$_6$) was added.

Comparative Example 4

A polymer electrolyte and a secondary battery comprising the same were prepared in the same manner as in Comparative Example 1 except that 10 g of an ionic liquid (EMIM-TFSI) was further added per 90 g of the polymer electrolyte during the preparation of the secondary battery.

TABLE 1

|  | Polymer electrolyte | | | | | | | |
|  | polymer | | Electron- | Molar ratio of | Lithium salt | | Ionic liquid | |
|  | Formula | Molecular weight | acceptor Formula | Polymer:electron-acceptor | Type | Concentration (M) | Type | Content (%) |
| Example 1 | 2a | 660,000 | 3 | 1:0.2 | — | — | — | — |
| Example 2 | 1a | 743,000 | 4 | 1:0.2 | — | — | — | — |
| Example 3 | 1b | 936,000 | 5 | 1:0.2 | — | — | — | — |
| Example 4 | 1c | 1,300,000 | 6 | 1:0.2 | — | — | — | — |
| Example 5 | 2a | 660,000 | 7 | 1:0.2 | LiPF$_6$ | 1 | — | — |
| Example 6 | 1a | 743,000 | 7 | 1:0.1 | LiPF$_6$ | 1 | — | — |
| Example 7 | 1b | 936,000 | 5 | 1:0.1 | LiPF$_6$ | 1 | — | — |
| Example 8 | 1c | 1,300,000 | 6 | 1:0.1 | LiPF$_6$ | 1 | — | — |
| Example 9 | 2a | 660,000 | 7 | 1:0.1 | LiPF$_6$ | 1 | EMIM-TFSI | 10 |
| Example 10 | 1b | 936,000 | 5 | 1:0.1 | LiPF$_6$ | 1 | EMIM-TFSI | 10 |

TABLE 1-continued

| | Polymer electrolyte | | | | Lithium salt | | Ionic liquid | |
|---|---|---|---|---|---|---|---|---|
| | polymer | | Electron-acceptor Formula | Molar ratio of Polymer:electron-acceptor | Type | Concentration (M) | Type | Content (%) |
| | Formula | Molecular weight | | | | | | |
| Example 11 | 2a | 660,000 | 3 | 1:400 | — | — | — | — |
| Example 12 | 1a | 743,000 | 4 | 1:400 | — | — | — | — |
| Example 13 | 2a | 2,100,000 | 7 | 1:0.001 | — | — | — | — |
| Example 14 | 1c | 2,440,000 | 7 | 1:0.001 | — | — | — | — |
| Comparative Example 1 | 2a | 660,000 | — | — | $LiPF_6$ | 1 | — | — |
| Comparative Example 2 | 8 | 600,000 | 6 | 1:0.2 | — | — | — | — |
| Comparative Example 3 | 8 | 600,000 | — | — | $LiPF_6$ | 1 | — | — |
| Comparative Example 4 | 2a | 660,000 | — | — | $LiPF_6$ | 1 | EMIM-TFSI | 10 |

EXPERIMENTAL EXAMPLES

Experimental Example 1. Ionic Conductivity Measurement

A circular gold (Au) electrode having a diameter of 1 mm was coated on each of the polymer electrolytes prepared in Examples 1 to 12 and Comparative Examples 1 to 4 using a sputtering method, and ionic conductivity was then measured by an AC impedance method depending on temperature. The ionic conductivity was measured in a frequency range of 0.01 Hz to 1 MHz using a VMP3 measurement instrument and 4294A. The measurement results are presented in Table 2 below.

TABLE 2

| | Ionic conductivity (S/cm) |
|---|---|
| Example 1 | $2.2 \times 10^{-6}$ |
| Example 2 | $1.5 \times 10^{-6}$ |
| Example 3 | $2.1 \times 10^{-6}$ |
| Example 4 | $1.8 \times 10^{-6}$ |
| Example 5 | $6.3 \times 10^{-6}$ |
| Example 6 | $4.3 \times 10^{-6}$ |
| Example 7 | $5.9 \times 10^{-6}$ |
| Example 8 | $5.0 \times 10^{-6}$ |
| Example 9 | $3.1 \times 10^{-5}$ |
| Example 10 | $2.3 \times 10^{-5}$ |
| Example 11 | $3.6 \times 10^{-6}$ |
| Example 12 | $2.6 \times 10^{-6}$ |
| Example 13 | $6.3 \times 10^{-7}$ |
| Example 14 | $5.4 \times 10^{-7}$ |
| Comparative Example 1 | $7.8 \times 10^{-9}$ |
| Comparative Example 2 | $2.0 \times 10^{-9}$ |
| Comparative Example 3 | $1.4 \times 10^{-9}$ |
| Comparative Example 4 | $2.4 \times 10^{-6}$ |

As illustrated in Table 2, with respect to the polymer electrolytes of Examples 1 to 8, 11, and 12 comprising the polymer and electron acceptor of the present invention, it may be understood that ionic conductivities were mostly excellent at about $1.5 \times 10^{-6}$ or more.

In contrast, ionic conductivity of the polymer electrolyte of Comparative Example 1, which did not comprise the electron-acceptor, was $7.8 \times 10^{-9}$ and ionic conductivities of the polymer electrolytes of Comparative Examples 2 and 3, which did not comprise the polymer represented by Formula 1 or 2 of the present invention, were $2.0 \times 10^{-9}$ and $1.4 \times 10^{-9}$, respectively, wherein it may be understood that the ionic conductivities were lower than those of the polymer electrolytes of Examples 1 to 8.

Ionic conductivities of the polymer electrolytes of Examples 13 and 14, which comprised the polymer having a high weight-average molecular weight and a relatively small amount of the electron-acceptor, were $6.3 \times 10^{-7}$ and $5.4 \times 10^{-7}$, respectively, wherein it may be confirmed that the ionic conductivities were improved in comparison to that ($7.8 \times 10^{-9}$) of the polymer electrolyte of Comparative Example 1 which did not comprise the electron-acceptor, or those of the polymer electrolytes of Comparative Examples 2 and 3 which comprised the polymer represented by Formula 8, but the ionic conductivities were reduced due to low processability in comparison to the polymer electrolytes of Examples 1 to 8, 11, and 12. Also, ionic conductivities of the polymer electrolytes of Examples 9 and 10 of the present invention, which further comprised the ionic liquid, were $3.1 \times 10^{-5}$ and $2.3 \times 10^{-5}$, respectively, wherein it may be understood that the ionic conductivities were significantly improved in comparison to the ionic conductivity ($2.4 \times 10^{-6}$) of the polymer electrolyte of Comparative Example 4 which did not comprise the electron-acceptor.

Experimental Example 2. Electrochemical Stability Test

Electrochemical stabilities of the secondary batteries prepared in Examples 1, 5, 9, and 11 and the secondary batteries prepared in Comparative Examples 1 and 4 were measured up to 7 V at 60° C. using linear sweep voltammetry (LSV) or cyclic voltammetry.

TABLE 3

| | Oxidation stability (V) @60° C. |
|---|---|
| Example 1 | 6 V~ |
| Example 5 | 6 V~ |
| Example 9 | 6 V~ |
| Example 11 | 6 V~ |
| Comparative Example 1 | 5.8 V~ |
| Comparative Example 4 | 5.5 V~ |

As illustrated in Table 3, with respect to the secondary batteries prepared in Examples 1, 5, 9, and 11, since oxidation initiation voltages were about 6.0 V or more, it may be confirmed that excellent electrochemical stabilities were obtained.

In contrast, with respect to the secondary batteries of Comparative Examples 1 and 4, oxidation initiation voltages were 5.8 V and 5.5 V, respectively, wherein it may be understood that the oxidation initiation voltages were lower than those of the secondary batteries of Examples 1, 5, 9, and 11. From these results, with respect to the polymer electrolytes of the present invention, it may be confirmed that oxidation stabilities were improved in comparison to those of the secondary batteries of Comparative Examples 1 and 4.

The invention claimed is:

1. A polymer electrolyte for a secondary battery, the polymer electrolyte comprising:
a polymer represented by Formula 1 or Formula 2; and
an electron-acceptor having at least one double bond, as a dopant:

[Formula 1]

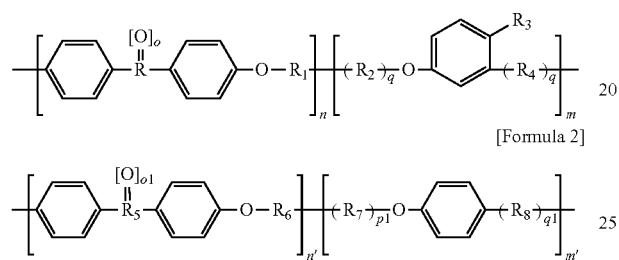

[Formula 2]

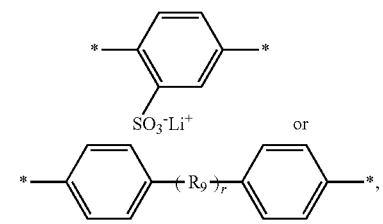

wherein R and $R_5$ are each independently carbon (C) or sulfur (S), $R_1$ is

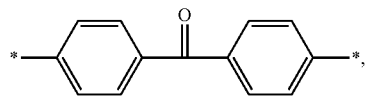

wherein $R_9$ is —$C(CF_3)_2$—, $R_2$ and $R_7$ are

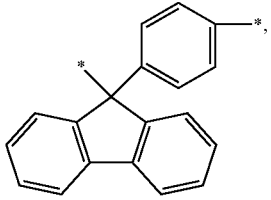

$R_3$ is —$S(CF_2)_2SO_3^-Li^+$, $R_4$ is

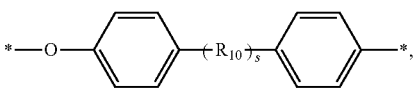

wherein $R_{10}$ is —$C(CF_3)_2$—, $R_6$ is

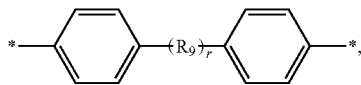

wherein $R_9$ is —$C(CF_3)_2$—, $R_8$ is o and o1 are 1 or 2, p, p1, q, q1, r, and s are 0 or 1, a ratio of n:m is in a range of 95:5 to 5:95 as a molar ratio, and a ratio of n':m' is in a range of 95:5 to 5:95 as a molar ratio.

2. The polymer electrolyte for a secondary battery of claim 1, wherein, in Formula 1, the ratio of n:m is in a range of 40:60 to 60:40 as a molar ratio, and in Formula 2, the ratio of n':m' is in a range of 40:60 to 60:40 as a molar ratio.

3. The polymer electrolyte for a secondary battery of claim 1, wherein the polymer represented by Formula 1 or Formula 2 has a weight-average molecular weight (Mw) of 5,000 g/mol to 1,500,000 g/mol.

4. The polymer electrolyte for a secondary battery of claim 1, wherein the polymer represented by Formula 1 comprises at least one selected from the group consisting of compounds represented by Formulae 1a to 1c:

[Formula 1a]

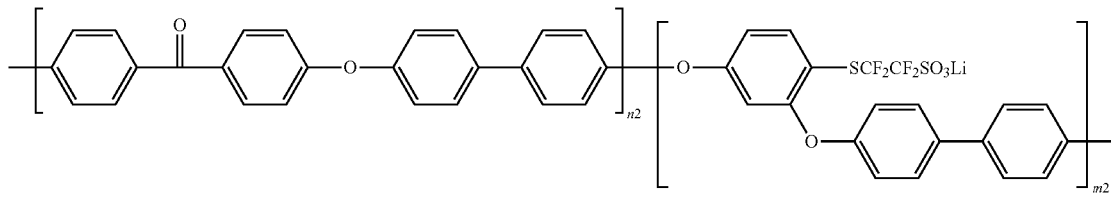

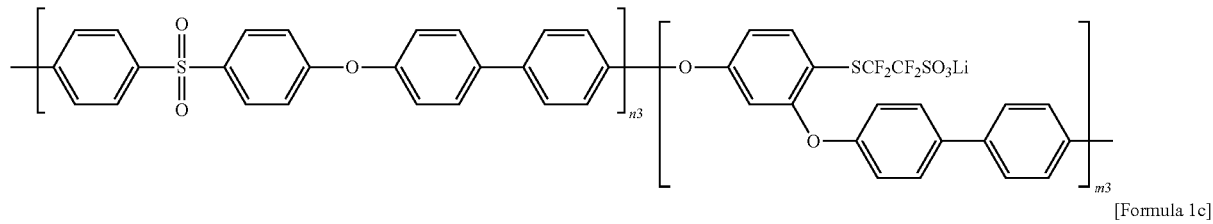

[Formula 1b]

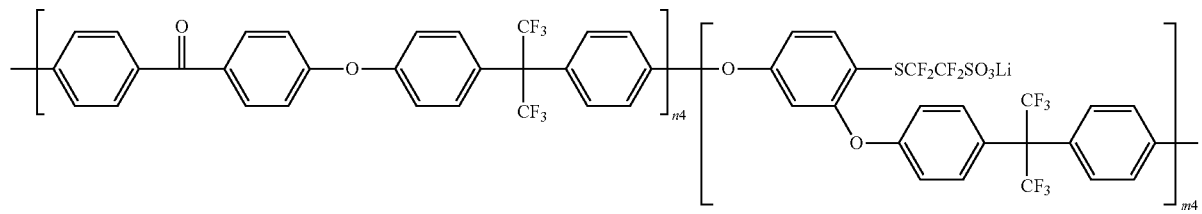

[Formula 1c]

wherein, in Formulae 1a to 1c, a ratio of n2:m2 is in a range of 95:5 to 5:95 as a molar ratio, a ratio of n3:m3 is in a range of 95:5 to 5:95 as a molar ratio, and a ratio of n4:m4 is in a range of 95:5 to 5:95 as a molar ratio.

5. The polymer electrolyte for a secondary battery of claim 1, wherein the electron-acceptor comprises at least one selected from the group consisting of Formulae 3 to 7:

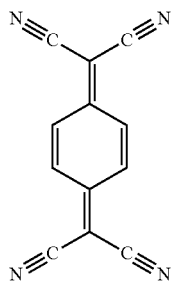

[Formula 3]

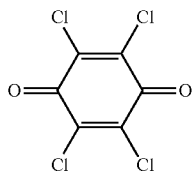

[Formula 4]

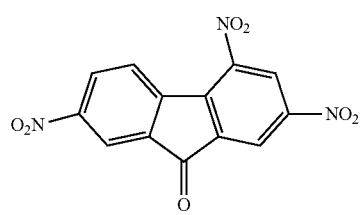

[Formula 5]

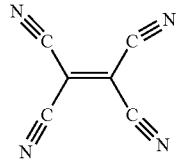

[Formula 6]

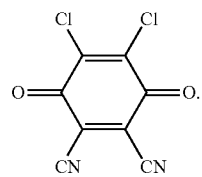

[Formula 7]

6. The polymer electrolyte for a secondary battery of claim 1, wherein a molar ratio of the polymer:the electron-acceptor is in a range of 1:0.01 to 1:500.

7. The polymer electrolyte for a secondary battery of claim 1, further comprising a lithium salt.

8. The polymer electrolyte for a secondary battery of claim 7, wherein the lithium salt comprises $Li^+$ as a cation, and comprises at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $B(C_2O_4)_2^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2N$—, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

9. The polymer electrolyte for a secondary battery of claim 7, wherein the lithium salt is comprised in a concentration of 0.5 M to 5 M in the polymer electrolyte for a secondary battery.

10. The polymer electrolyte for a secondary battery of claim 1, wherein the polymer electrolyte is a free-standing solid polymer electrolyte.

11. The polymer electrolyte for a secondary battery of claim 1, further comprising an ionic liquid.

12. The polymer electrolyte for a secondary battery of claim 11, wherein the ionic liquid comprises at least one selected from the group consisting of diethylmethylammonium trifluoromethanesulfonate, dimethylpropylammonium trifluoromethanesulfonate, N,N-diethyl-N-methyl-N-(2-methoxyethyl)ammonium bis(trifluoromethanesulfonyl)imide, N-methyl-N-propylpiperidinium bis(trifluoromethanesulfonyl)imide, 1-ethyl-3-methylimidazolium-bis(trifluoromethylsulfonyl)imide, 1-ethyl-3-methylimidazolium bis(fluorosulfonyl)imide, N-methyl-N-propylpyrrolidinium bis(fluorosulfonyl)imide, N-methyl-N-propylpyrrolidinium bis(trifluoromethanesulfonyl)imide, N-butyl-N-methyl pyrrolidinium bis(trifluoromethanesulfonyl)imide, and methyl propylpiperidinium trifluoromethanesulfonylimide.

13. The polymer electrolyte for a secondary battery of claim 11, wherein the ionic liquid is comprised in an amount of 0.01 wt % to 50 wt % based on a total weight of the polymer electrolyte.

14. The polymer electrolyte for a secondary battery of claim 11, wherein the polymer electrolyte is a solid polymer-liquid hybrid electrolyte.

15. A lithium secondary battery comprising:
  a positive electrode;
  a negative electrode; and
  a polymer electrolyte formed on at least one surface of the positive electrode and the negative electrode,
  wherein the polymer electrolyte comprises the polymer electrolyte for a secondary battery of claim 1.

* * * * *